(12) United States Patent
Schneider et al.

(10) Patent No.: US 11,771,530 B2
(45) Date of Patent: Oct. 3, 2023

(54) DENTAL PROSTHESIS FORMING BLOCK AND METHOD FOR PRODUCING A DENTAL PROSTHESIS FROM THE DENTAL PROSTHESIS FORMING BLOCK

(71) Applicant: DENTSPLY SIRONA INC., York, PA (US)

(72) Inventors: Sascha Schneider, Mühltal (DE); Peter Fornoff, Reichelsheim (DE)

(73) Assignee: DENTSPLY SIRONA INC., York, PA (US)

( * ) Notice: Subject to any disclaimer, the term of this patent is extended or adjusted under 35 U.S.C. 154(b) by 389 days.

(21) Appl. No.: 16/767,630

(22) PCT Filed: Nov. 28, 2018

(86) PCT No.: PCT/EP2018/082834
§ 371 (c)(1),
(2) Date: May 28, 2020

(87) PCT Pub. No.: WO2019/106007
PCT Pub. Date: Jun. 6, 2019

(65) Prior Publication Data
US 2020/0367998 A1 Nov. 26, 2020

(30) Foreign Application Priority Data
Nov. 28, 2017 (DE) .......................... 102017221343.4

(51) Int. Cl.
*A61C 8/00* (2006.01)
*A61C 13/00* (2006.01)
*A61C 13/083* (2006.01)

(52) U.S. Cl.
CPC .......... *A61C 8/0051* (2013.01); *A61C 8/0013* (2013.01); *A61C 8/0022* (2013.01);
(Continued)

(58) Field of Classification Search
CPC ... A61C 8/0013; A61C 8/0022; A61C 8/0051; A61C 13/00074; A61C 13/0022; A61C 13/0835; A61C 13/0004
See application file for complete search history.

(56) References Cited

U.S. PATENT DOCUMENTS 9,230,683 B2 1/2016 Takemura
2008/0241793 A1* 10/2008 Collins ................ A61C 8/0006
433/174
(Continued)

FOREIGN PATENT DOCUMENTS

WO    WO-0134056 A1 *  5/2001  .......... A61C 8/0075
WO    2004103202 A1    12/2004
(Continued)

OTHER PUBLICATIONS

International Search Report; PCT/EP2018/082834; Feb. 25, 2019 (completed); dated Mar. 13, 2019.
(Continued)

*Primary Examiner* — Edward Moran
*Assistant Examiner* — Matthew P Saunders
(74) *Attorney, Agent, or Firm* — DENTSPLY SIRONA INC.

(57) ABSTRACT

The present invention relates to a dental prosthesis forming block (10) for producing a dental prosthesis (50). The forming block having a pin (20) with a self-tapping outer thread, which is arranged on a first surface (11) of the dental prosthesis forming block (10). The invention further relates to a method for producing a dental prosthesis (50). In this method the dental prosthesis block (10) is provided and the dental prosthesis (50) is produced by removing material from the dental prosthesis forming block (10) by a CAD/CAM method, such that the pin (20) forms part of the finished dental prosthesis (50).

10 Claims, 4 Drawing Sheets

(52) U.S. Cl.
CPC ...... *A61C 13/0004* (2013.01); *A61C 13/0022* (2013.01); *A61C 13/0835* (2013.01)

(56) References Cited

U.S. PATENT DOCUMENTS

| | | | | |
|---|---|---|---|---|
| 2010/0003640 | A1* | 1/2010 | Damstra | A61C 19/04 433/201.1 |
| 2011/0045439 | A1* | 2/2011 | Tripodakis | A61C 8/0075 433/174 |
| 2012/0251979 | A1 | 10/2012 | Karim | |
| 2013/0022943 | A1* | 1/2013 | Collins | A61C 8/0016 433/174 |
| 2013/0288200 | A1* | 10/2013 | Battula | A61C 8/0009 433/173 |
| 2015/0025855 | A1* | 1/2015 | Fisker | A61C 9/004 703/1 |
| 2016/0199159 | A1 | 7/2016 | Brehm | |
| 2017/0239021 | A1* | 8/2017 | Klein | A61C 8/0075 |
| 2018/0140393 | A1* | 5/2018 | Matouk | A61C 13/0004 |

FOREIGN PATENT DOCUMENTS

| | | | | |
|---|---|---|---|---|
| WO | WO-201403824 | A1 * | 10/2017 | |
| WO | WO-2017169037 | A1 * | 10/2017 | A61C 13/0022 |
| WO | 2018093408 | A1 | 5/2018 | |

OTHER PUBLICATIONS

Written Opinion of the International Searching Authority; PCT/EP2018/082834; Feb. 25, 2019 (completed); dated Mar. 13, 2019.
International Preliminary Report on Patentability; PCT/EP2018/082834; Feb. 25, 2019 (completed); dated Mar. 13, 2019.
European Office Action dated Mar. 11, 2022.

* cited by examiner

DENTAL PROSTHESIS FORMING BLOCK AND METHOD FOR PRODUCING A DENTAL PROSTHESIS FROM THE DENTAL PROSTHESIS FORMING BLOCK

TECHNICAL FIELD

The present invention relates to a dental prosthesis forming block. It also relates to a method for producing a dental prosthesis from the dental prosthesis forming block. Furthermore, the present invention relates to a computer program that executes all steps of the method when it runs on a computing device, and a data carrier that stores this computer program. Finally, the invention relates to a dental CAD/CAM system which is designed to carry out the method.

BACKGROUND OF THE INVENTION

One-piece dental implants, in which the abutment part is firmly connected to the implant, have so far been produced in standard forms. These standard implants can be made of ceramic or titanium, for example, and can be linear or angled. Customization of the one-piece standard implants is difficult, however, because for this purpose the pre-produced parts must be kept and processed extra-orally, allowing for later screw-in rotation and screw-in height. It is very difficult to customize standard implants only after they have been inserted and healed into the jaw, since the energy to be introduced could heat or loosen the parts.

An alternative to standard implants is therefore implants that consist of several parts. These can be screwed into a customizable abutment structure. These can then be processed extra-orally without any problems. However, with a multi-part implant, gaps can form between the individual elements. These allow bacteria to migrate into the interior of the implant and from there to intermittently escape over time due to mechanical effects of chewing and infect the bone. This leads to peri-implantitis, which manifests itself in bone loss and a consequent loss of the implant. In addition, in multi-part implants mechanical wear can occur at the connection of the elements. After several million chewing cycles, the screw and thus also the structure loosens, or the screw even breaks.

Automated CAD/CAM processes are increasingly being used to manufacture the abutments of multi-part implants, in which the respective tooth replacement part is carved out from a dental prosthesis block. This enables manufacturers to offer a high level of quality and accuracy of fit for dental prostheses at low prices.

It is an object of the present invention to provide a dental prosthesis forming block suitable for producing a dental prosthesis which does not have the disadvantages of multi-part implants mentioned above by means of a CAD/CAM method. Another object of the invention is to provide a method for producing such a dental prosthesis.

SUMMARY OF THE INVENTION

This object is achieved by a dental prosthesis forming block for producing a dental prosthesis, in particular an implant, which has a pin with a self-tapping external thread. The pin is arranged in a first surface of the dental prosthesis forming block. Since the pin is already part of the dental prosthesis forming block, it is possible to use a CAD/CAM process extra-orally to produce a one-piece dental prosthesis in the form of an implant therefrom. This combines the advantage of the one-piece design of standard implants in that no loosening of individual components can take place and that no gaps colonizable by bacteria can form in the implant, with the advantage of multi-part implants in that extra-oral manufacture of the abutment is possible. This production does not need to take place in a dental laboratory, but can also be carried out in a dental practice.

The pin is preferably made of a metal, such as titanium in particular. The dental prosthesis forming block preferably consists at least partially of a ceramic, such as, in particular, zirconium dioxide. On the one hand, this enables the dental prosthesis to be securely anchored in the jaw by means of the metal pin, and on the other hand, allows for an aesthetically pleasing design of the ceramic structure.

In order to give the structure particular stability, it is preferred that it have an inner material that is at least partially surrounded by an outer material. The inner material is particularly preferably a metal and the outer material is a ceramic. As a result, this embodiment of the dental prosthesis forming block can also be used to produce aesthetically pleasing dental prosthesis with a ceramic surface, while the metal core gives the dental prostheses particular stability. In one embodiment, the inner material has a lower hardness than the outer material. Hardness is understood to mean in particular the Vickers hardness (HV 10) according to the standard DIN EN ISO 6507-1: 2005 to -4: 2005. A metal such as titanium (Vickers hardness approx. 200 HV 10) is advantageous as the inner material because of the good biocompatibility and healing properties thereof, while a ceramic such as particularly zirconium dioxide ($ZrO_2$, Vickers hardness approx. 1250 HV 10) or lithium disilicate (Vickers hardness approx. 650 HV 10) or glass ceramic is advantageous as the outer material because of the aesthetics thereof.

Alternatively, the inner material and the outer material are particularly preferably metals. The metal of the outer material is harder than the metal of the inner material. Titanium (Vickers hardness approx. 200 HV 10) is advantageous as the inner material because of the good biocompatibility and healing properties thereof, while cobalt-chromium alloy (CoCr, Vickers hardness approx. 300 HV 10) is advantageous as the outer material because of the economy thereof.

In yet another embodiment, the inner material and the outer material have the same hardness. In particular, the inner and outer material are identical. In this case, zirconium dioxide ($ZrO_2$, Vickers hardness approx. 1250 HV 10) is advantageous as the inner and outer material because of the good biocompatibility and aesthetics thereof.

In yet another embodiment, the inner material has a greater hardness than the outer material. Zirconium dioxide ($ZrO_2$, Vickers hardness approx. 1250 HV 10) is advantageous as the inner material because of the biocompatibility and aesthetics thereof; lithium disilicate or glass ceramic is advantageous as the outer material thereof because of the aesthetics and workability thereof.

In order to ensure a particularly secure anchoring of the pin in the dental prosthesis forming block, it is preferred that the pin is formed in one piece with the inner material.

In order to accelerate the healing of the pin in the jawbone, it preferably has an osseointegration coating. This consists in particular of hydroxyapatite. Hydroxyapatite is a natural component of bone tissue. The pin material is thus covered with a bioidentical camouflage coating, so that the ingrowth of the pin into the jawbone is identical to the healing process of a broken bone. Applying this osseointegration coating directly to the pin of the mold block is advantageous since such coatings cannot usually be produced in a dental laboratory or in a dental practice. Processing the dental prosthesis forming block in a CAD/CAM process can also ensure that the osseointegration coating will not be damaged.

This would not be guaranteed, for example, in the case of standard one-piece implants, since they must be clamped via the pin thereof for processing.

In a preferred form of the dental prosthesis block, it has an internal thread which extends from a second surface through the dental prosthesis mold block to the pin. The second surface is opposite the first surface. As a result, after the one-piece implant has been manufactured, further elements can be screwed thereonto.

The object is further achieved by the method for producing a dental prosthesis item. In this, a dental prosthesis forming block according to the invention is initially provided. The dental prosthesis is manufactured by removing material from the dental prosthesis forming block. This is done using a CAD/CAM process. The direction of the material removal is selected so that the pin forms part of the finished dental prosthesis. The method therefore makes it possible to use known CAD/CAM techniques in order to produce a one-piece dental prosthesis, in particular an implant, from the dental prosthesis forming block.

In contrast to the processing of one-piece standard implants, which must be clamped in via their pins, the dental prosthesis block can be fixed via one of the surfaces thereof in a CAD/CAM process. It is advantageous to protect the pin from contact with material removal tools during material removal. This can prevent damage to the external thread of the pin or damage to any osseointegration coating that may be present.

In a preferred embodiment of the method, this protection of the pin is achieved by covering it with a cover during the removal of material.

In another preferred embodiment of the method, a virtual protective volume is provided around the pin in the CAD/CAM method. The material removal tools are then controlled so that they must not be inserted into the protective volume.

If the dental prosthesis forming block has an internal thread that extends from the second surface to the pin, the dental prosthesis part is preferably manufactured in such a way that a dental prosthetic care element can be screwed into the internal thread of the dental prosthesis. The dental prosthetic care element can be an abutment, for example. In this embodiment, the one-piece dental prosthesis then only forms a base for the abutment.

The computer program according to the invention is set up to carry out all steps of the method when it runs on a computing device. It enables the implementation of different embodiments of the method on a computing device of a dental CAD/CAM system without needing to make structural changes therein. For this purpose, it is stored in particular on a machine-readable data carrier.

By loading the computer program onto a conventional dental CAD/CAM system, a dental CAD/CAM system according to the invention which is set up to carry out the method is obtained.

BRIEF DESCRIPTION OF THE DRAWINGS

Exemplary embodiments of the inventions are shown in drawings and are explained in more detail in the description below.

DETAILED DESCRIPTION OF THE INVENTION

Figure 1:
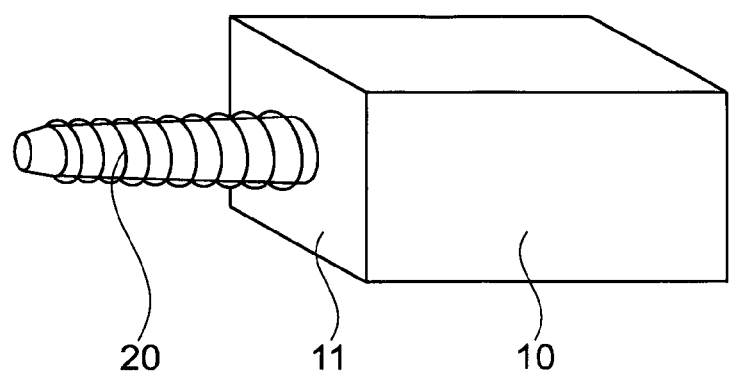
FIG. 1 shows an isometric illustration of a dental prosthesis forming block according to an exemplary embodiment of the invention.
Figure 2:
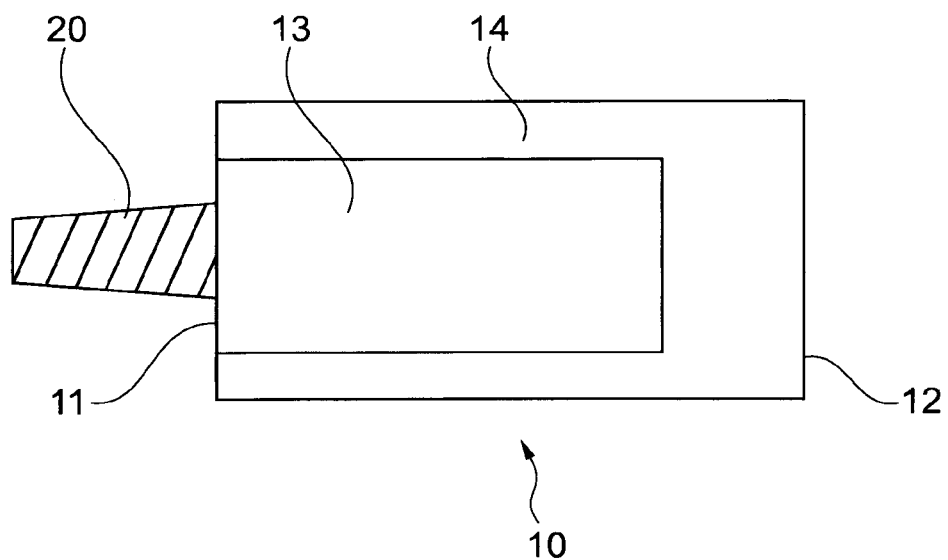
FIG. 2 shows a cross-sectional view of the dental prosthesis forming block according to FIG. 1.

A dental prosthesis forming block 10 according to a first embodiment of the invention is shown in FIGS. 1 and 2. It is cuboid in shape and has a surface 11 and a second surface 12 opposite thereto. A core of the dental prosthesis forming block 10 is made of titanium as an inner material 13. Zirconium dioxide is pressed thereonto as the outer material 14. As a result, the first surface 11 consists partly of titanium and partly of zirconium dioxide, while all other surfaces of the dental prosthesis forming block 10 consist exclusively of zirconium dioxide. The inner material 13 is formed in one piece with a pin 20, which has a self-tapping external thread and protrudes from the first surface 11. The external thread of the pin 20 is coated with hydroxyapatite.

In a second exemplary embodiment of the dental prosthesis forming block 10, the core of the dental prosthesis forming block 10 consists of titanium as an inner material 13. The outer material 14 is cobalt-chromium alloy (CoCr).

In a third exemplary embodiment of the dental prosthesis forming block 10, the core of the dental prosthesis forming block 10 consists of titanium as an inner material 13. The outer material 14 is a lithium disilicate or glass ceramic.

Figure 3:
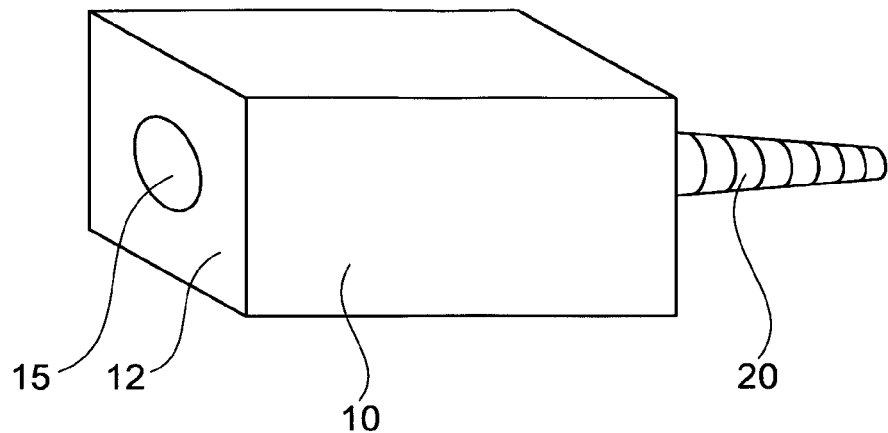
FIG. 3 shows an isometric illustration of a dental prosthesis forming block according to another exemplary embodiment of the invention.
Figure 4:
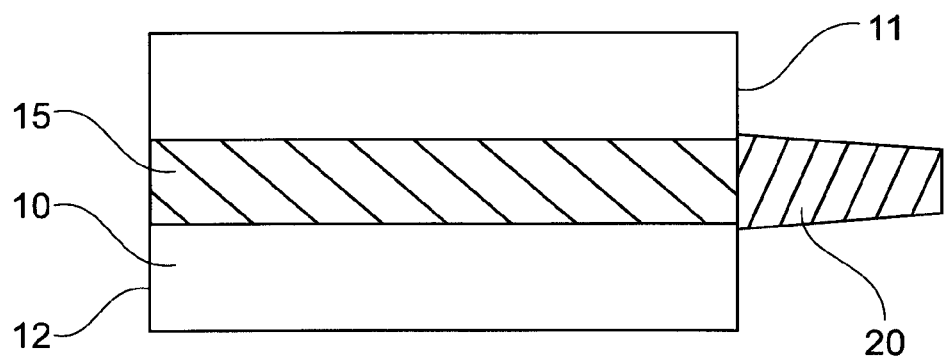
FIG. 4 shows a cross-sectional view of the dental prosthesis forming block according to FIG. 3.
Figure 5:
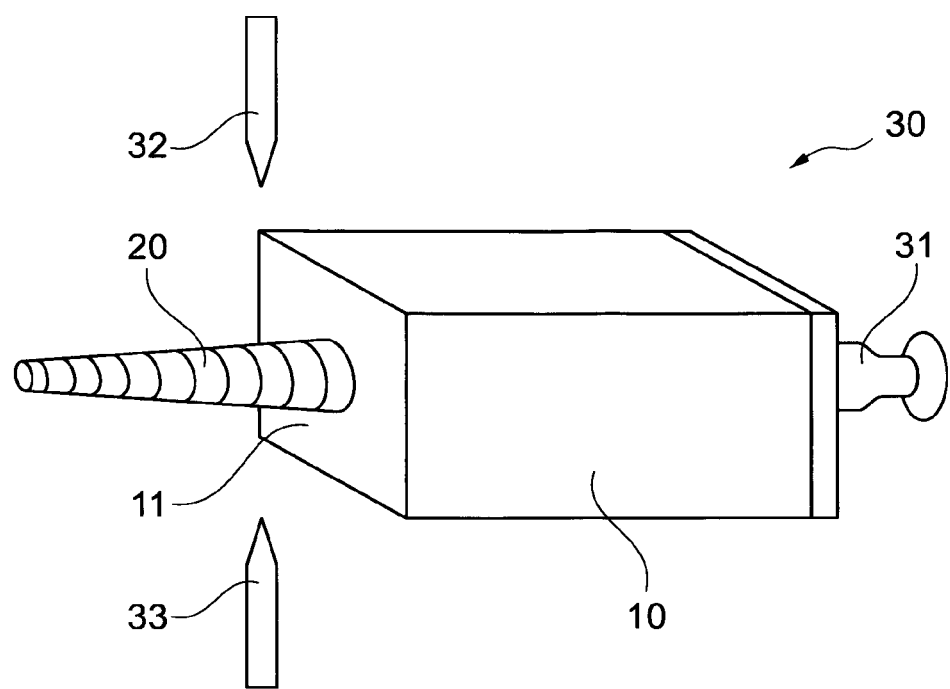
FIG. 5 shows a first processing step of a dental prosthesis forming block in a method according to an exemplary embodiment of the invention.

In a fourth exemplary embodiment of the dental prosthesis forming block 10, which is shown in FIGS. 3 and 4, it consists entirely of zirconium dioxide, to which the pin 20 is attached on the first surface 11. In the fourth exemplary embodiment, this consists of titanium coated with hydroxyapatite. Between the first surface 11 and the second surface 12, an opening with an internal thread 15 passes through the dental prosthesis forming block 10.

In a fifth exemplary embodiment of the dental prosthesis forming block 10, this also has the structure shown in FIGS. 3 and 4. Both the dental prosthesis forming block 10 and the pin 20 are made of zirconium dioxide. The pin is coated with hydroxyapatite.

In a first exemplary embodiment of the method according to the invention, a desired shape of a dental prosthesis is defined in a dental CAD/CAM system 30. Then a dental prosthesis forming block 10 is inserted into the CAD/CAM system 30 according to one of the exemplary embodiments described above and fixed there on the second surface 12 thereof by means of a block holder 31. This is shown in FIG.

5. Material removal tools 32, 33 are positioned above and below the dental prosthesis forming block 10. A virtual protective volume, into which the material removal tools 32, 33 must not penetrate, is defined around the pin 20.

Figure 6:
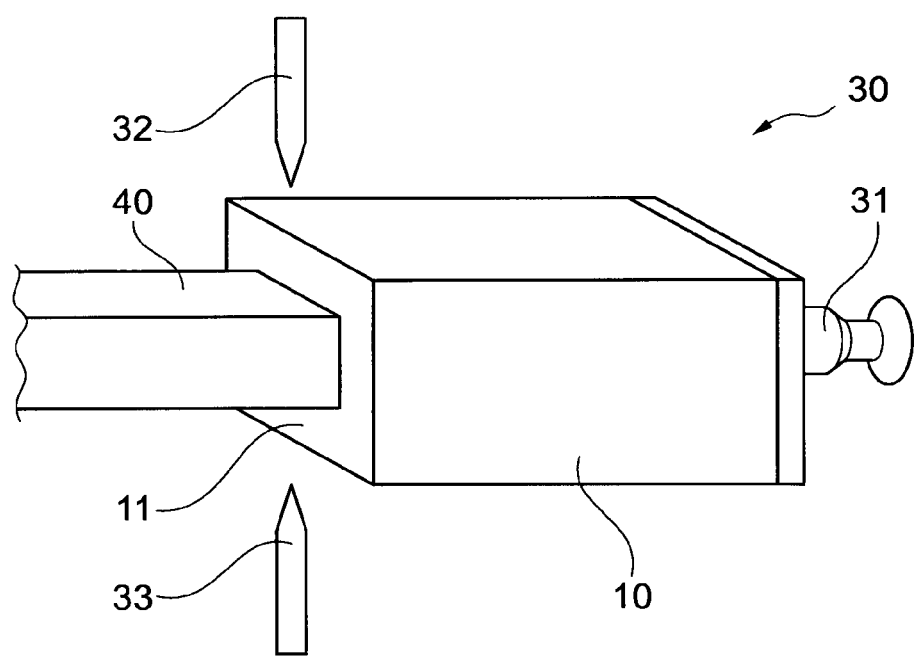
FIG. 6 shows a first processing step of a dental prosthesis forming block in a method according to another exemplary embodiment of the invention.

A second exemplary embodiment of the method according to the invention differs from the first exemplary embodiment in that the virtual protective volume is dispensed with. Instead, the pin 20 is physically protected by a cover 40 being placed thereover so that it completely surrounds the pin 20. This is shown in FIG. 6.

Figure 7:
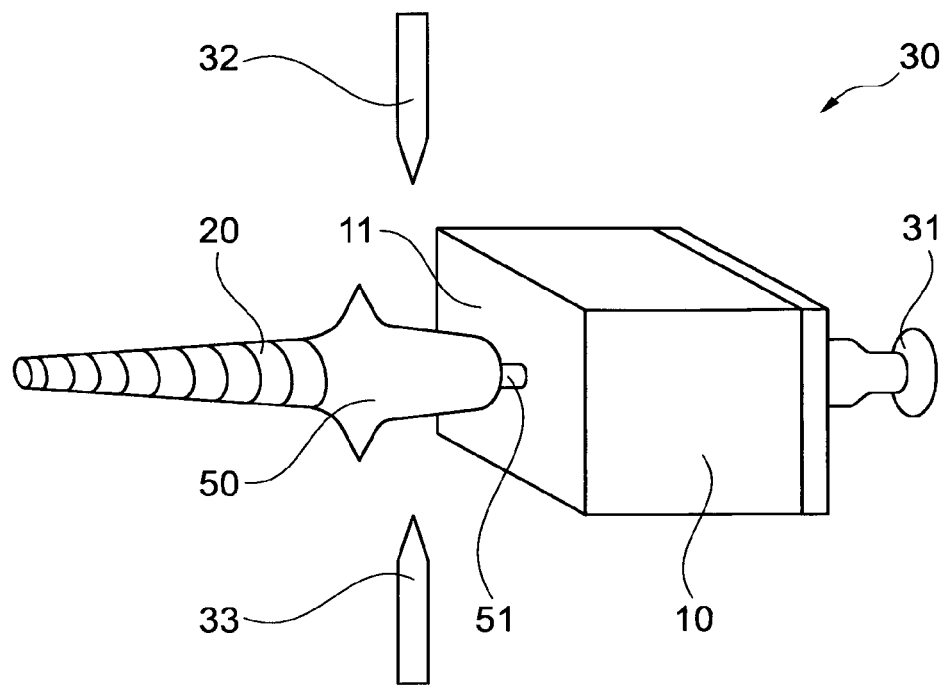
FIG. 7 shows a second processing step of a dental prosthesis forming block in a method according to an exemplary embodiment of the invention.

In both exemplary embodiments of the method according to the invention, starting from the first surface 11, the material removal tools 32, 33 are used to remove material from the dental prosthesis forming block 10 in order to form a dental prosthesis 50. As shown in FIG. 7, this is only connected to the dental prosthesis forming block 10 via a tap 51 at the end of the material removal. After removal of the tap 51, the finished dental prosthesis 50, which is formed in one piece with the pin 20, can be removed from the CAD/CAM system 30.

Figure 8:
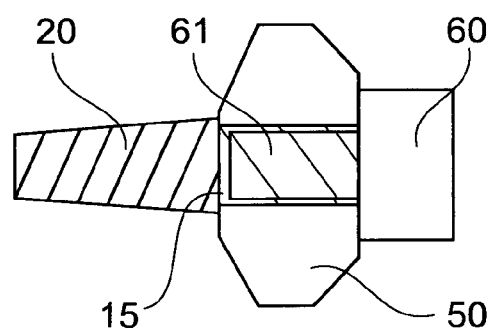
FIG. 8 shows a cross-sectional illustration of a dental prosthesis which can be produced by means of an exemplary embodiment of the method according to the invention.

If the dental prosthesis 50 was produced from a dental prosthesis forming block 10 according to the fourth exemplary embodiment, it still has the internal thread 15 between the pin 20 and a surface which is produced in the course of the material removal and is opposite the pin 20. A dental prosthetic care element 60 in the form of an abutment can be screwed into the internal thread by means of a screw 61, as shown in FIG. 8.

The examples of the dental prosthesis forming block and the method described above enable the one-piece, customized manufacture of dental prostheses in the form of implants.

The invention claimed is:

1. A dental prosthesis forming block for producing a dental prosthesis, the dental prosthesis forming block comprising:
   a cuboid shaped material comprising an inner material and an outer material that is different from the inner material, the cuboid shaped material further comprises a first surface at a first end that is proximal to a pin and a second surface at a second end opposite the first end, and
   the pin having a self-tapping external thread, the pin being disposed at the first surface of the dental prosthesis forming block,
   wherein the first surface comprises a portion of the inner material and another portion of the outer material,
   wherein the inner material comprises said portion that is part of the first surface and remaining portions that are not part of the first surface,
   wherein the inner material is completely surrounded on the remaining portions by the outer material such that all outer surfaces of the cuboid shaped material external to the first surface are part of the outer material, and
   wherein the inner material has a lower Vickers hardness relative to the outer material.

2. The dental prosthesis forming block according to claim 1, wherein the inner material is a metal and the outer material is a ceramic.

3. The prosthesis forming block according to claim 1, wherein the inner material and the outer material are metals.

4. The prosthesis block according to claim 1, wherein the pin is formed in one piece with the inner material.

5. The prosthesis forming block according to claim 1, wherein the pin has an osseointegration coating.

6. The prosthesis forming block according to claim 1, further comprising an internal thread which extends from a second surface opposite the first surface through the dental prosthesis forming block to the pin.

7. A method of making a dental prosthesis comprising the steps of:
   providing a dental prosthesis forming block according to claim 1, and producing the dental prosthesis by material removal from the dental prosthesis forming block by means of a CAD/CAM process, so that the pin forms part of the dental prosthesis.

8. The method according to claim 7, wherein the pin is covered by a cover during the removal of material.

9. The method according to claim 8, wherein the CAD/CAM method provides a virtual protective volume around the pin into which no material removal tools may be introduced.

10. The method according to claim 7, wherein the dental prosthesis forming block further includes an internal thread which extends from the second surface opposite the first surface through the dental prosthesis forming block to the pin and the dental prosthesis is manufactured such that a dental prosthetic care element is screwable into the internal thread of the dental prosthesis.

* * * * *